(12) United States Patent
Fosdike

(10) Patent No.: US 9,446,747 B2
(45) Date of Patent: Sep. 20, 2016

(54) BRAKE CONTROLLER FOR TOWED VEHICLE BRAKING SYSTEM AND METHOD

(71) Applicant: REDARC TECHNOLOGIES PTY LTD, South Australia (AU)

(72) Inventor: Timothy Fosdike, South Australia (AU)

(73) Assignee: REDARC TECHNOLOGIES PTY LTD, Morphett Vale (AU)

( * ) Notice: Subject to any disclaimer, the term of this patent is extended or adjusted under 35 U.S.C. 154(b) by 0 days.

(21) Appl. No.: 14/535,688

(22) Filed: Nov. 7, 2014

(65) Prior Publication Data

US 2015/0232075 A1    Aug. 20, 2015

(30) Foreign Application Priority Data

Feb. 17, 2014    (AU) ................................ 2014900483

(51) Int. Cl.
| | | |
|---|---|---|
| G06F 7/70 | (2006.01) | |
| B60T 8/17 | (2006.01) | |
| B60T 8/171 | (2006.01) | |

(52) U.S. Cl.
CPC .............. B60T 8/1708 (2013.01); B60T 8/171 (2013.01)

(58) Field of Classification Search
CPC .......... B60T 13/00; B60T 8/24; B60T 13/58; B60T 13/74; B60T 2230/06
USPC ...... 701/70, 71, 79; 303/24.4, 20, 24.1, 123; 188/112 A, 112 R
See application file for complete search history.

(56) References Cited

U.S. PATENT DOCUMENTS

| | | | | |
|---|---|---|---|---|
| 4,030,756 A | * | 6/1977 | Eden | ............................ 303/9.68 |
| 4,196,936 A | * | 4/1980 | Snyder | ............................ 303/20 |
| 5,000,519 A | * | 3/1991 | Moore | ............................ 303/7 |

(Continued)

FOREIGN PATENT DOCUMENTS

| | | |
|---|---|---|
| GB | 2454224 A | 5/2009 |
| WO | WO-01/76925 A1 | 10/2001 |

OTHER PUBLICATIONS

First Examination Report issued by the New Zealand Intellectual Property Office on Oct. 8, 2014 for application NZ 631286 (Applicant—Redarc Technologies Pty Ltd) (2 pages).

(Continued)

*Primary Examiner* — Gertrude Arthur Jeanglaud
(74) *Attorney, Agent, or Firm* — Ballard Spahr LLP

(57) ABSTRACT

A brake controller is disclosed for a towed vehicle braking system. The controller is adapted to be mounted in a towing or a towed vehicle having a longitudinal axis for generating a braking control signal to the towed vehicle braking system. The controller comprises an inertial sensor including plural sensor axes adapted to be mounted in an undefined orientation relative to the longitudinal axis for generating sensor data associated with each sensor axis. The controller also comprises a memory device for storing the sensor data associated with each sensor axis and a processor for processing the sensor data with the braking control signal to evaluate orientation of the inertial sensor relative to the longitudinal axis. In particular the brake controller is adapted to control activation of the towed vehicle braking system in a manner that is relatively insensitive to acceleration of the vehicle in a lateral direction and to orientation of the inertial sensor without prescribing a mounting orientation of the brake controller relative to the towing or towed vehicle. A method of operating a brake controller for a towed vehicle braking system is also disclosed.

25 Claims, 4 Drawing Sheets

(56) References Cited

U.S. PATENT DOCUMENTS

| | | | |
|---|---|---|---|
| 6,644,761 B2* | 11/2003 | Schuck | 303/123 |
| 7,311,364 B2 | 12/2007 | Robertson | |
| 7,347,507 B1 | 3/2008 | Stillinger | |
| 8,708,112 B2* | 4/2014 | Maisonneuve | 188/112 R |
| 2004/0245849 A1 | 12/2004 | Kissel | |
| 2009/0118960 A1 | 5/2009 | Harrison | |
| 2010/0007200 A1 | 1/2010 | Pelosse | |
| 2010/0222979 A1 | 9/2010 | Culbert et al. | |
| 2013/0297166 A1 | 11/2013 | Thomas et al. | |

OTHER PUBLICATIONS

Extended European Search Report issued by the European Patent Office on Jul. 21, 2015 for application EP 14189223.2, filed on Oct. 16, 2014 (Applicant—Redarc Technologies Pty Ltd // Inventor—Fosdike) (6 pages).

International-Type Search Report issued by the Australian Patent Office on Aug. 15, 2014 for application AU 2014900483, filed on Feb. 17, 2014 (Applicant—Redarc Technologies Pty Ltd) (8 pages).

* cited by examiner

BRAKE CONTROLLER FOR TOWED VEHICLE BRAKING SYSTEM AND METHOD

TECHNICAL FIELD

The present invention relates to a brake controller for an accelerometer based towed vehicle braking system and a method of operating the brake controller.

BACKGROUND OF INVENTION

Towed vehicles such as trailers of various classes have different braking systems. Commonly, trailers with weights between 750 kg and 3.5 tons have electromagnetic braking systems or hydraulic braking systems controlled by electromagnetic actuators. For both of these systems the braking force in the trailer is controlled by an electrical signal from the towing vehicle.

Historically, the level of trailer braking was controlled by a simple manual adjustment of output level. More recently, trailer braking systems exist that attempt to provide a simpler user experience by providing trailer braking proportional to towing vehicle braking. One common way to implement this is to use an accelerometer or pendulum to measure vehicle braking force and to apply proportional force with the trailer brakes. Known products using an accelerometer to measure vehicle braking force have been required to be installed in a particular orientation to allow braking force to be measured along a single axis.

However a difficulty may arise because the accelerometer may measure not only the braking deceleration, but also artefacts. Artefacts that may be measured include i) noise from road; ii) gravity, adjusted by pitch and roll of the vehicle; iii) centripetal acceleration; and iv) acceleration due to pitch and roll, assuming that the accelerometer is not placed at the centroid of the vehicle. Designs for brake controllers exist that compensate for (ii) by eliminating components not in the horizontal plane. However, such systems are sensitive to lateral acceleration of the vehicle since they do not compensate for (ii) or for horizontal components of (i) or (iv). Existing systems that measure only forward acceleration require mounting at a specific angle to the vehicle axes.

The present invention may provide a brake controller for a towed vehicle braking system and a method for operating the brake controller. The controller and method may include an acceleration model to minimise the above mentioned artefacts and/or to provide more optimal calculation of deceleration. The controller and method may include one or more feedback algorithms for measurement, calibration and/or validation of direction and consequent calculation of deceleration/braking force in a forward direction.

The controller and method may also include one or more algorithms for automating generation of parameters for the acceleration model.

A reference herein to a patent document or other matter which is given as prior art is not to be taken as an admission that that document or matter was known or that the information it contains was part of the common general knowledge in Australia or elsewhere as at the priority date of any of the disclosure or claims herein. Such discussion of prior art in this specification is included to explain the context of the present invention in terms of the inventor's knowledge and experience.

Throughout the description and claims of this specification the words "comprise" or "include" and variations of those words, such as "comprises", "includes" and "comprising" or "including", are not intended to exclude other additives, components, integers or steps.

SUMMARY OF INVENTION

According to one aspect of the present invention there is provided a brake controller for a towed vehicle braking system, said controller being adapted to be mounted in a towing or a towed vehicle having a longitudinal axis for generating a braking control signal to said towed vehicle braking system, said controller comprising: an inertial sensor including plural sensor axes adapted to be mounted in an undefined orientation relative to said longitudinal axis for generating sensor data associated with each sensor axis; a memory device for storing said sensor data associated with each sensor axis; and a processor for processing said sensor data with said braking control signal to evaluate said orientation of said inertial sensor relative to said longitudinal axis; whereby said brake controller is adapted to control activation of said towed vehicle braking system in a manner that is relatively insensitive to acceleration of said vehicle in a lateral direction and to said orientation of said inertial sensor without prescribing a mounting orientation of said brake controller relative to said towing or towed vehicle.

The brake controller may include additional circuitry for control and measurement of braking systems and/or vehicle status.

The processor may be adapted to perform feedback calibration on the sensor data to facilitate determining a forward direction vector of said vehicle in a frame of reference of said inertial sensor and/or to reduce effects of said acceleration of said vehicle in said lateral direction. The calibration may include single shot calibration, continuous calibration or continuous checking of calibration to facilitate determining a forward direction vector of said vehicle in a frame of reference of said inertial sensor and/or to reduce effects of said acceleration of said vehicle in said lateral direction. The processor may perform cross-correlation of the sensor data with the braking control signal and/or a brake light signal such that a direction of maximum correlation is used as an estimate of the longitudinal axis. The cross correlation may be performed using vector mathematics and/or a filtering process may be followed by filtering in an angular or vector domain. In some embodiments the cross-correlation may be performed using filtering in an angular or vector domain. The towed vehicle may include a trailer. The inertial sensor may include a multi-axis accelerometer. The multi-axis accelerometer may be adapted to sense braking forces on the towed and towing vehicles. The brake controller may be mounted in the towing or towed vehicle.

According to a further aspect of the present invention there is provided a method of operating a brake controller for a towed vehicle braking system, wherein said controller is adapted to be mounted in a towing or a towed vehicle having a longitudinal axis for generating a braking control signal to said towed vehicle braking system, said method comprising: mounting an inertial sensor including plural sensor axes in an undefined orientation relative to said longitudinal axis for generating sensor data associated with each sensor axis; storing said sensor data associated with each sensor axis in a memory device; and processing said sensor data with said braking control signal to evaluate said orientation of said inertial sensor relative to said longitudinal axis; whereby said brake controller is adapted to control activation of said towed vehicle braking system in a manner that is relatively insensitive to acceleration of said vehicle in a lateral direction and to said orientation of said inertial sensor without prescribing a mounting orientation of said brake controller relative to said towing or towed vehicle.

BRIEF DESCRIPTION OF DRAWINGS

A preferred embodiment of the present invention will now be described with reference to the accompanying drawings wherein.

DETAILED DESCRIPTION

Figure 1:
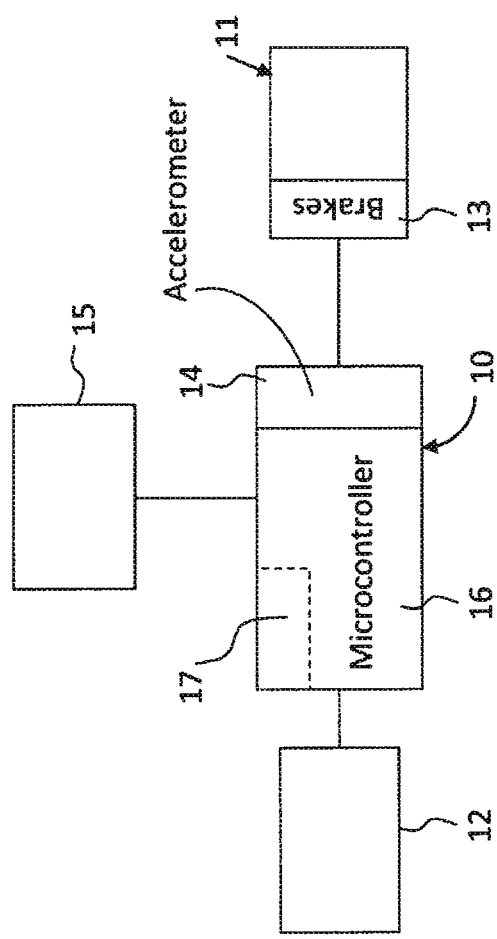
FIG. 1 shows a trailer braking system including a vehicle mounted brake controller.

FIG. 1 shows a trailer braking system including a brake controller 10 mounted in a towing vehicle (not shown) with wires leading back to a towed vehicle such as a trailer 11. Controller 10 is associated with a remote head 12 for providing potentiometer based gain control, a pushbutton for status control and one or more LEDs for displaying status of the braking system. Brake controller 10 is adapted to operate trailer brakes 13 based on sensed deceleration of the towing vehicle. Brake controller 10 includes a multi-axis inertial sensor/accelerometer 14 for sensing deceleration to the towing vehicle along a plurality of directional axes. Brake controller 10 includes an input 15 from the towing vehicle brake light circuit for determining when the vehicle brakes are applied.

Brake controller 10 includes a microprocessor or microcontroller 16 that is responsive to the sensed deceleration to supply power to trailer brakes 13 that may be a function of the sensed deceleration. Microcontroller 16 is adapted to execute one or more algorithms stored in an associated memory such as RAM and/or ROM 17 to facilitate measurement and/or validation of direction and/or calculation of acceleration and/or braking force in a forward or towing direction.

Known controllers of this type need to be compensated for artefacts as discussed above. The known controllers also have been required to be installed in a predetermined orientation to allow braking force to be measured along a single axis or alternatively have needed to be manually compensated for mounting orientation relative to the towing vehicle, or alternatively may have an increased sensitivity to lateral acceleration.

Described below are an acceleration model and algorithms that may facilitate measurement and/or validation of direction and/or consequent calculation of deceleration and braking force in a forward direction to reduce or remove effects of lateral acceleration and/or other artefacts of a measurement process.

Acceleration Model

In the following discussion, there may be three different reference frames with different basis vectors. In an external reference frame three directions may be denoted, namely $X_{ext} = \{\vec{x}_{ext}, \vec{y}_{ext}, \vec{z}_{ext}\}$.

In the towing vehicle's reference frame, three directions may be denoted, namely) $X_{car} = \{\vec{x}_{car}, \vec{y}_{car}, \vec{z}_{car}\}$.

In an accelerometer reference frame, the basis may be denoted as $X_{acc} = \{\vec{x}, \vec{y}, \vec{z}\}$. Conversion between the reference frames may be performed by rotation matrices $Q_{car}$: $X_{ext} \rightarrow X_{car}$ and $Q_{acc}$: $X_{car} \rightarrow X_{acc}$. In the following discussion, it is assumed that $Q_{car}$ may vary with time, and that $Q_{acc}$ is fixed but unknown.

Measurement from the accelerometer may be modelled as:

$$\vec{a}_{total} = \vec{a}_f + \vec{g} + \vec{a}_c + \vec{a}_l + \vec{n} + \vec{o} \quad (1)$$

wherein:

$\vec{a}_f = A_{desired} \cdot \vec{x}_{car}$ denotes acceleration due to braking or acceleration of a vehicle/trailer system and $A_{desired}$ denotes desired input to a braking control. During normal braking $A_{desired}$ may be expected to lie in the range $0 \leq A_{desired}$ $$\leq 4.5 \frac{m}{s^2};$$

$\vec{g}$ denotes acceleration due to gravity and is approximately equal to 9.81

$$\frac{m}{s^2} \cdot \vec{z}_{ext} \approx 9.81 \frac{m}{s^2} \cdot \vec{z}_{car};$$

$\vec{a}_c$ denotes centripetal acceleration of the vehicle and is equal to $$\frac{v^2}{r} \cdot \vec{y}_{car}.$$

Based on a sample of curves including radius r equal to 10 m and velocity v equal to $$2 \frac{m}{s}$$

for a slow suburban corner, and radius r equal to 200 m and velocity v equal to $$30 \frac{m}{s}$$

for a wide rural curve, $\vec{a}_c$ may be expected to lie in the range $$0 \leq \|\vec{a}_c\| \leq 4.5 \frac{m}{s^2};$$

$\vec{a}_l$ denotes acceleration due to changes in roll and pitch of the vehicle and uneven road surface. It may be in any direction, depending on the kind of movement and the location of the accelerometer relative to the towing vehicle. This may be expected to include transients with $\|\vec{a}_l\| \gg \|\vec{g}\|$. Duration of transients may be expected to be less than 200 ms. This may be expected to increase with speed. Some transients may also occur due to engine noise, passenger movement and/or driver movement. Acceleration $\vec{a}_c$ will likely have zero mean over periods of less than 1 second;

$\vec{n}$ denotes measurement noise of the accelerometer. This is expected to be independently Gaussian distributed in each axis with a Brownian spectrum. The level of the noise is generally also specified in the data-sheet for the accelerometer; and $\vec{o}$ denotes offset of the accelerometer. This may generally be non-zero and is composed of two main contributions, namely: raw offset, which may be relatively constant in $X_{acc}$ and gain non-linearity and cross-axis sensitivity acting on gravity, which may vary with $Q_{car}$.

Figure 2:
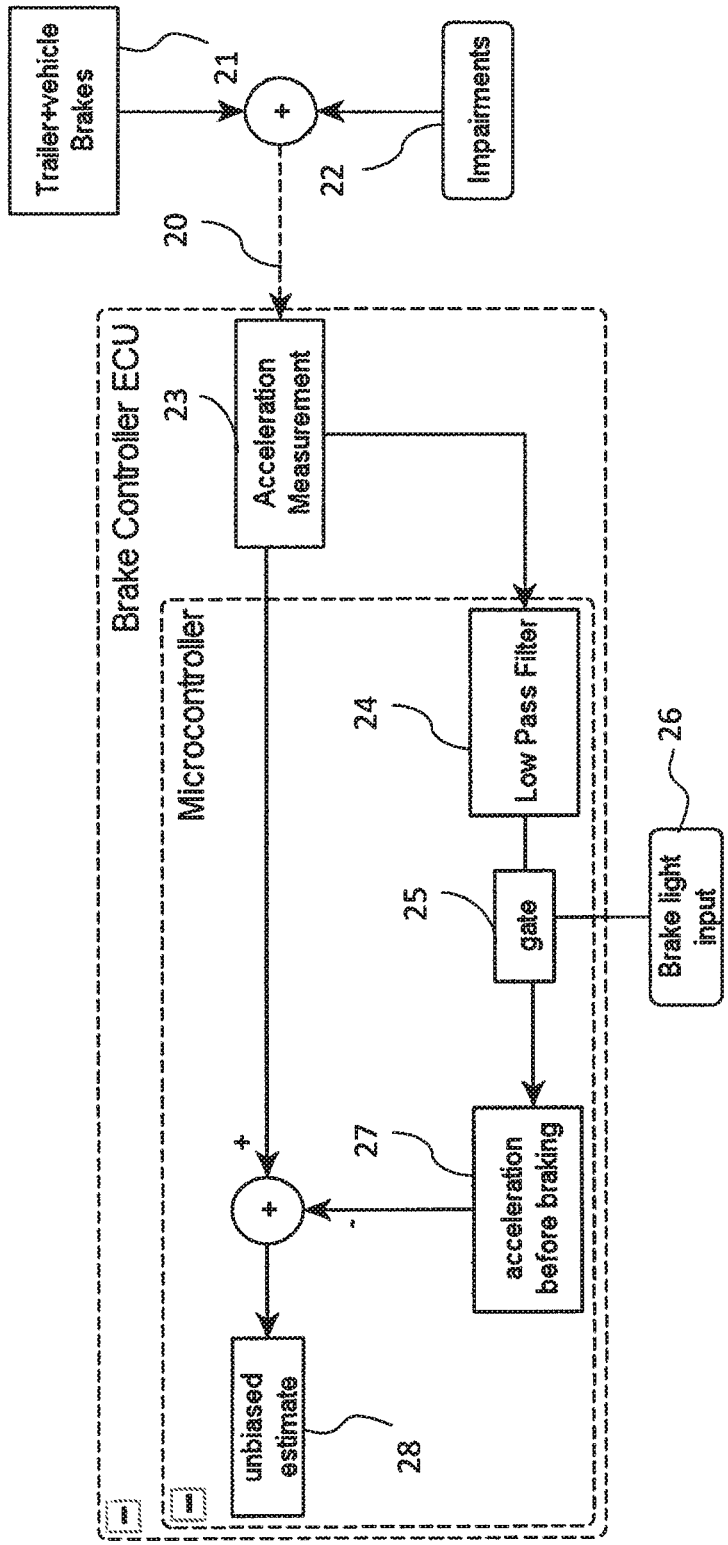
FIG. 2 shows a braking system and brake controller with a calibration algorithm for calculating a desired value of acceleration.

FIG. 2 shows a braking system and brake controller with a calibration algorithm for calculating the aforesaid desired value of acceleration ($A_{desired}$) from a combined acceleration signal ($\vec{a}_{total}$). The calibration algorithm may derive a scalar value $A_{desired}$ from the aforesaid measurement $\vec{a}_{total}$. The calibration algorithm may include two steps as described below, namely offset component removal and scalar conversion.

Offset Component Removal

The first step is to remove accelerator offset components including components which relate to x-axis sensitivity to gravity. Since $\vec{a}_c$, $\vec{a}_l$, and $\vec{n}$ are zero-mean processes with relatively high bandwidths, a local average $\vec{\mu}_{local}$ of measured acceleration ($\vec{a}_{total}$) may be a good estimator of $\vec{g}+\vec{o}$ if $Q_{car}$ is constant over the averaging period, so that $\vec{g}+\vec{o}-\vec{\mu}_{local}\approx\vec{0}$.

In many circumstances, this assumption can be made for on-road travel and a high pass filter may be applied with cut-off above the bandwidth of $\vec{a}_c$, $\vec{a}_l$, and $\vec{n}$, but below the bandwidth of the transformation matrix $Q_{car}$, to reduce or remove the offset components.

However, this has a potential to cause problems such as drift when a constant level of braking is applied, due to a component of braking acceleration falling outside of the bandwidth of the high pass filter. To avoid or at least minimize this problem a high pass filter may be implemented as shown in FIG. 2.

Measured acceleration may be continuously averaged to estimate local average $\vec{\mu}_{local}$, and then frozen at the start of braking to prevent drift due to direct current (DC) component of braking. The steps of the process are described below.

Referring to FIG. 2, total acceleration 20 consists of a summation of Trailer+vehicle Brakes block 21, which corresponds to acceleration $\vec{a}_f$ in equation (1), plus impairments block 22 which includes non-braking components of acceleration in equation (1). Total acceleration 20 is measured by the accelerometer in acceleration measurement block 23.

The output of acceleration measurement block 23 ($\vec{a}_{total}$) is filtered with low-pass filter 24 to provide an estimate $\vec{\mu}_{local}$, of $\vec{g}+\vec{o}$. The bandwidth of low-pass filter 24 is less than 1 Hz to reject short-term variations in $Q_{car}$ due to change in road camber and/or slope.

The filtered acceleration is then gated at gate 25 via brake light signal 26. When there is no brake light signal 26 $\vec{\mu}_{local}$ is allowed to vary. When brake light signal 26 is asserted, then low pass filter 24 continues to operate, but its output will be discarded at gate 25. Only the last estimate of $\vec{\mu}_{local}$ from before the brake lights were asserted is used. Subtracting the last estimate of $\vec{\mu}_{local}$ provides low pass filtered data in acceleration before braking block 27.

The low-pass filtered data from block ($\vec{\mu}_{local}$) is then subtracted from the output of acceleration measurement block 23 to form an implicit high-pass filter. The output of this implicit high-pass filter provides an unbiased estimate 28 of $\vec{a}_{total}$ with biases or constant offset components removed.

The offset removal step produces a vector output $\vec{a}_{total}-\vec{\mu}_{local}$, and is followed by a scalar conversion step which may produce a scalar estimate of acceleration $\hat{A}_{desired}$.

Scalar Conversion

In order to estimate a forward component of the acceleration common, Euclidean vector projection using the Euclidean inner product (also known as dot product) may be used to estimate $A_{desired}$ as follows:

$$\hat{A}_{desired}=\vec{x}_{car}\cdot(\vec{a}_{total}-\vec{\mu}_{local}) \qquad (2)$$

wherein the operator · is the Euclidean inner product and $\|\vec{x}_{car}\|=1$.

Substituting in equation (1), with its associated definitions, we have:

$$\hat{A}_{desired} = \qquad (3)$$
$$\vec{x}_{car}\cdot\left(A_{desired}\cdot\vec{x}_{car}+\frac{v^2}{r}\cdot\vec{y}_{car}\right)+\vec{x}_{car}\cdot(\vec{a}_l+\vec{n})+\vec{x}_{car}\cdot(\vec{g}+\vec{o}-\vec{\mu}_{local})$$

Since $X_{car}$ is orthonormal, we know that $\vec{x}_{car}\cdot\vec{x}_{car}=1$, $\vec{x}_{car}\cdot\vec{y}_{car}=0$ and $\vec{x}_{car}\cdot\vec{y}_{car}=0$, so that the centripetal acceleration is eliminated.

$$\hat{A}_{desired}=A_{desired}+\vec{x}_{car}\cdot(\vec{a}_l+\vec{n})+\vec{x}_{car}\cdot(\vec{g}+\vec{o}-\vec{\mu}_{local})\approx A_{desired}+\vec{x}_{car}\cdot(\vec{a}_l+\vec{n}) \qquad (4)$$

In addition and assuming that and if are isotropic, the RMS magnitude of $\vec{x}_{car}\cdot(\vec{a}_l+\vec{n})$ will be reduced by a factor of $\sqrt{3}$ from $\|\vec{a}_l+\vec{n}\|$ due to reduction in dimension. Based on empirical vibration profiles (e.g. as specified in MIL-STD 810G Table 514.6C-VI), the assumption of isotropic vibration is likely to be a worst-case assumption.

Algorithm for Calculating Calibration Coefficients

In order to perform calculations for estimating $A_{desired}$ from a measurement of $\vec{a}_{total}$) the following values are required:

Offset vector: $\vec{\mu}_{local}$

Direction vector: $\vec{x}_{car}$

Since all estimation data is acquired in the $X_{acc}$ basis, with $Q_{car}$ and $Q_{acc}$ unknown, the algorithm for acquiring offset and direction vectors may also operate in this basis.

The algorithm for measuring offset vector $\vec{\mu}_{local}$ may comprise a simple low-pass filter as shown in FIG. 2.

Two algorithms for measuring $\vec{x}_{car}$ are suggested below. The algorithms have in common that they rely on feedback from a brake output and/or a brake light input to accelerometer measurement. They are also able to determine if a calibrated direction is valid in the presence of impairments during calibration, as given in equation (1).

The algorithms differ in the signal that they generate and the method used to calculate direction from feedback. The first algorithm is suitable for single shot calibration and is described below under the heading FEEDBACK CALIBRATION WITH SPECIAL SIGNAL.

The second algorithm may be suitable for continuous calibration or checking of calibration and is described below under the heading FEEDBACK CALIBRATION USING NORMAL BRAKING SIGNALS.

Feedback Calibration with Special Signal

Based on equation (1), the only component of the measured signal that depends significantly on the output signal is $\vec{a}_f A_{desired} \cdot \vec{x}_{car}$. Therefore, a good estimate $\vec{x}_{car}$ may be obtained by correlating the measured signal with the input signal.

However, since the braking force is always greater than 0, the braking acceleration always has a non-zero mean, and may be confused with other non-zero mean signals such as $\vec{g}$ and $\vec{o}$. Therefore the DC component of the correlation should be ignored. This may be implemented by superimposing a zero-mean test or reference signal on a DC braking component and then correlating the feedback with the test or reference signal. The zero-mean signal will ensure that the DC component of the measurement is removed during the correlation process.

Figure 3:
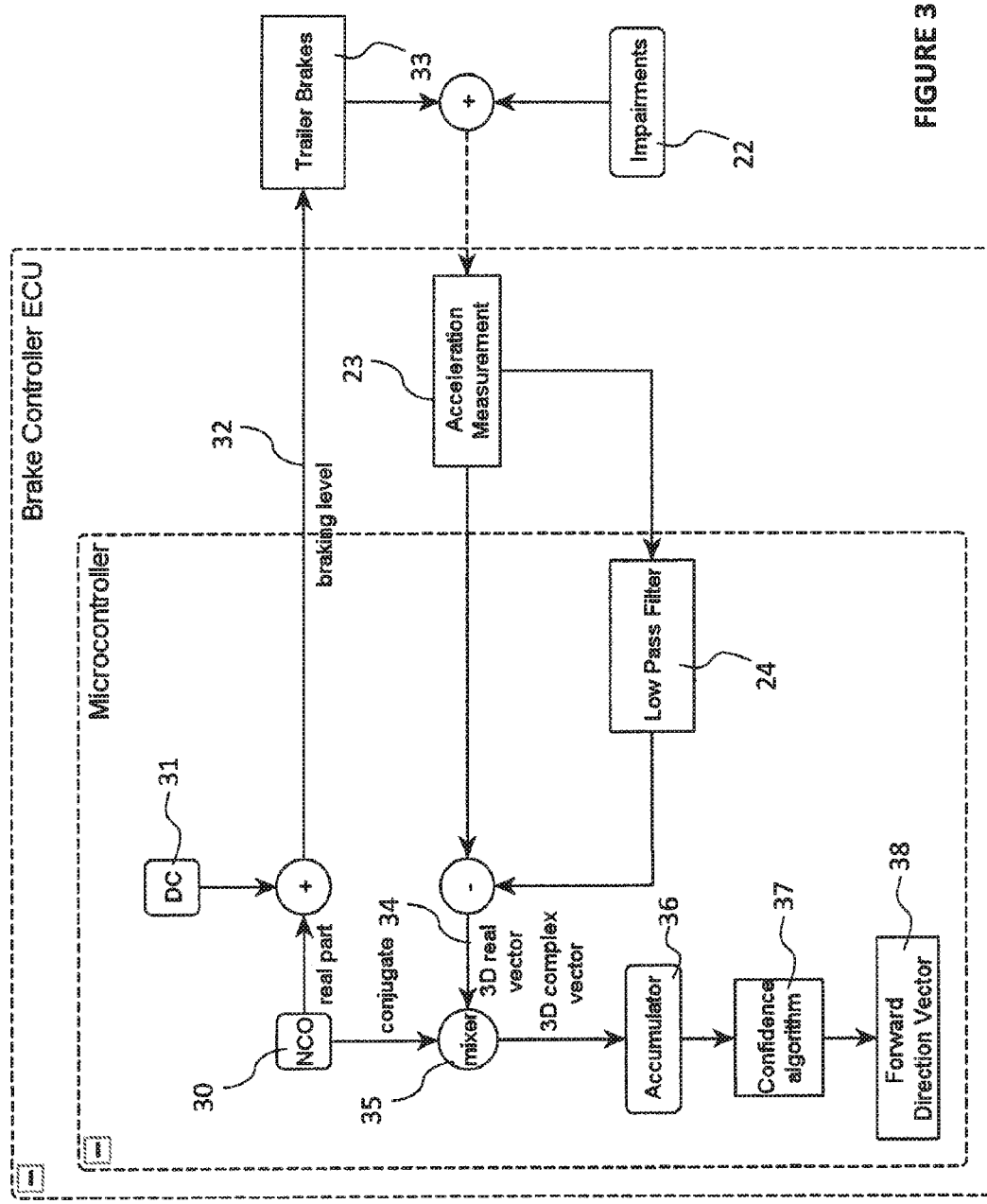
FIG. 3 shows a braking system and brake controller with an algorithm for feedback chain calibration.

Any zero-mean test or reference signal may be used for this purpose but a higher computational efficiency may be achieved by using an offset sinusoidal signal. A signal processing flow chart for this is shown in FIG. 3. In FIG. 3, a sinusoidal signal is generated as the real part of the output of complex-valued numerically controlled oscillator (NCO) 30. NCO 30 may be implemented via a numerically simple operation, $$A_{NCO} \prod_{i=0}^{\frac{t}{t_0}} e^{j2\pi \frac{f}{f_s}} = A_{NCO} e^{j2\pi ft},$$

with the accumulator normalised to a magnitude of 1 at intervals in order to remove cumulative quantisation error.

A DC offset component 31 may be added to the output of NCO 30 to ensure that the braking signal 32 is non-negative (i.e. $\|DC\| \geq A_{NCO}$) so that no zero-crossings in the braking signal 32 are sent to Trailer Brakes 33.

As described above with reference to FIG. 2, total acceleration ($\vec{a}_{total}$) is measured by the accelerometer in acceleration measurement block 23 (refer equation (1)). For numerical stability, the signal is then high-pass filtered to remove the gravity component (which is much larger than the feedback signal component) as described with reference to FIG. 2.

The filtered real vector measurement 34 is then multiplied in complex mixer stage 35 with the conjugate of the complex scalar output of NCO 30. The output of complex mixer stage 35 is accumulated in accumulator block 36 until it passes a confidence threshold provided via confidence algorithm block 37. This output of confidence algorithm block 37 is then converted to a usable Forward Direction Vector in block 38.

The trailer brakes are assumed to be a linear time invariant (LTI) system. Basic physical analysis (not presented here) suggests that this may be a suitable first-order approximation.

As in FIG. 2, Impairments block 22 comprises non-braking components of acceleration in equation (1). Low pass filter 24 also has the same implementation and function as in FIG. 2.

Complex mixer stage 35 combined with accumulator block 36 remove the effect of LTI group delays (e.g. introduced by springs in the towing vehicle), by converting to a phase offset as shown in equation (5) below.

$$e^{j2\pi ft} \cdot \overline{e^{j2\pi f(t-t_0)}} = e^{j2\pi ft} \cdot e^{-j2\pi f(t-t_0)} = e^{j2\pi ft_0} \tag{5}$$

Accumulator block 36 sums the output of complex mixer stage 35 to obtain an estimate:

$$\overrightarrow{estimate}(t) = \sum_{i=0}^{\frac{t}{t_0}} \overrightarrow{acceleration_i} \cdot e^{-i2\pi f \cdot t} \tag{6}$$

A threshold based on noise level may be used to determine when calibration is complete. Assuming a measurement noise distribution independent of time and an LTI braking system, then by using the Central Limit theorem it may be shown that the statistical distribution of this estimation will converge to:

$$\overrightarrow{estimate}(t) = \sim \mathcal{N}\left(\frac{t}{t_0} G\vec{F}, \frac{t}{t_0} \sigma_0^2\right) \tag{7}$$

wherein:

$\mathcal{N}(\vec{\mu}, \sigma^2)$ is a multivariate complex Gaussian distribution with mean $\vec{\mu}$ and uniform variance $\vec{\mu}$;

$\frac{t}{t_0}$ is the number or samples cumulated. Note that the coefficient $\frac{t}{t_0}$ is not an exact value, but a reasonable estimate of the coefficient of $\sigma^2$, estimated using an assumption of white noise.

$\sigma_0$ is the root-mean-square (RMS) noise;

G is a complex gain factor due to time delays (converted to a complex phase per equation (4)), trailer gain and the level of the output; and $\vec{F}$ is the forward direction vector.

Confidence Algorithm block 37 may then determine when accumulator block 36 has reached a desired accuracy based on the comparison $$\left\|\overrightarrow{estimate}(t)\right\|^2 > \frac{(3\hat{\sigma})^2}{\tan^2(\theta_{limit})} \cdot n_{samples}, \tag{8}$$

wherein $\hat{\sigma}$ is the estimated signal variance, which is calculated from a sample set prior to calibration or from a pre-calculated value based on worst-case road noise, and $\theta_{limit}$ is the target angular accuracy of the calculation.

The final step is processed in Forward Direction Vector block 38 to remove phase offset from accumulator 36 and to convert to a real vector. This real vector is the estimate of $\vec{x}_{car}$ as required by equation (2) for calibration.

Feedback Calibration Using Normal Braking Signals

As noted above, the DC offset of normal braking signals may be difficult to distinguish from other DC offsets (e.g. gravity, accelerometer offset). This means that calibration based on normal braking as described above may be difficult to realize in practice. To address this problem an on-line calibration algorithm may be used to perform measurements on normal braking. The on-line calibration algorithm may use a measure of change of braking at the start of a braking period to generate a single braking direction estimate per braking event. Such a measure may effectively be a single estimate of cross correlation between a brake control signal and deceleration of the vehicle. The on-line calibration algorithm may use a statistical analysis algorithm to combine the estimates to provide a more accurate estimate or to provide a measure of confidence in the estimates.

On-Line Calibration Algorithm

Figure 4:
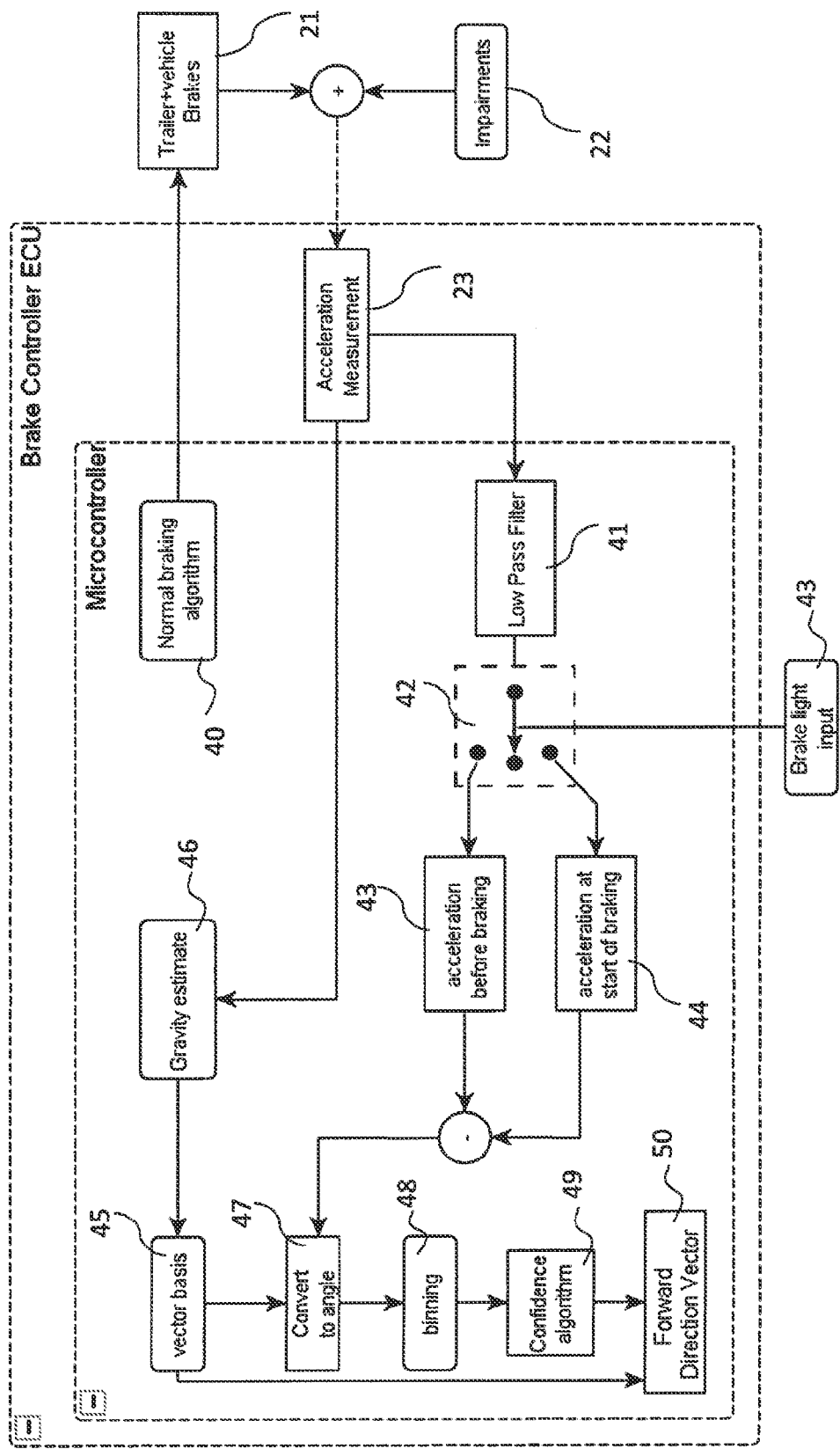
FIG. 4 shows a braking system and brake controller with an algorithm for performing on-line calibration.

FIG. 4 shows a braking system and brake controller with an algorithm for performing on-line calibration.

Normal Braking Algorithm block 40 is a placeholder for the algorithm used to control the Trailer+vehicle brakes block 21. Normal Braking Algorithm block 40 may include a fall-back timed algorithm if no direction calibration is available or a normal inertial feedback algorithm if this calibration algorithm is being used as a check.

Trailer+vehicle Brakes block 21, Impairments block 22 and Acceleration Measurement block 23 blocks are similar to corresponding numbered blocks described with reference to FIG. 2.

Low pass filter 41 may have a bandwidth between 1 Hz and 5 Hz. This bandwidth is higher than low pass filter 24 for $\vec{\mu}_{local}$ to reduce filter delay and provide a faster estimate of change in acceleration.

A delay gate may be used to select direction samples for on-line calibration. Switch 42 may be controlled by brake light input 43. The output of low pass filter 41 is normally stored in acceleration before braking block 43, but immediately after braking, the output will be discarded for a time $t_{delay}+t_{phase}$, wherein $t_{delay}$ is a worst-case expected delay on the trailer brakes (approximately 0.5 s for slack in couplings and suspension) and $t_{phase}$ is the group delay of low pass filter block 41. After this time, one sample of filter output will be stored in acceleration at start of braking block 44. Further samples will be discarded until the end of braking. The difference between blocks 43 and 44 may provide a sample of acceleration in the direction of braking. The low pass filter after the delay gate may also be implemented as a discrete-time integrator (summation).

A one dimensional weighted histogram of acceleration may be generated and used to determine azimuth. Vector basis block 45 represents a 2-D vector basis embedded in $X_{acc}$. It may be derived by starting with an estimate of gravity direction vector $\hat{\vec{z}}_{ext}$, generated in gravity estimate block 46 from a long term average of the accelerometer output. The two basis vectors are both orthogonal to $\hat{\vec{z}}_{ext}$ and may be generated using a Gram-Schmidt process.

The output of vector basis block 45 is subjected to a convert to angle operation in block 47. Convert to angle block 47 may include a simple atan 2 operation on the measurement, projected into the 2-D vector basis. For small microcontrollers that may be used in these applications, the algorithms presented in X. Girones, C. Julia, and D. Puig, "Full quadrant approximation for the arctangent function," IEEE Signal Processing Magazine, vol. 30, no. 1, pp. 130-135, January 2013 may be suitable.

The output of convert to angle block 47 is subjected to a binning step in block 48. The "binning" step may consist of adding a score based on magnitude of the acceleration measurement to a histogram bin corresponding to the calculated angle of the vector. Due to a possibility of braking in reverse, the bins may be wrapped on a half-interval [0, π) instead of over the whole angular range.

The output of binning block 48 is subjected to confidence algorithm block 49. Confidence algorithm block 49 may determine when the angular measurement is suitable for use. This may be based on peak bin (interpolated), compared with mean bin.

The output of confidence algorithm step 49 is subjected to Forward Direction Vector block 50. Forward Direction Vector block 50 may convert angle estimation to a vector estimating $\vec{x}_{car} X_{acc}$ by converting from the test vector basis to $X_{acc}$.

As an alternative to the operations of [00064] to [00068], a modified Kalman filter may be used to determine a forward direction vector as follows, Input to the filter may be the difference vectors of [00063] normalised as follows:

$$\Delta \hat{a}_{meas} = \frac{\Delta \hat{a}_{meas}}{\|\Delta \hat{a}_{meas}\|}$$

Braking measurements taken while the vehicle is braking may by comparison with the Kalman state estimate be as follows:

$$\Delta \hat{a}_{in} = \begin{cases} \Delta \hat{a}_{meas} & \text{if } \|\Delta \hat{a}_{meas} - \vec{k}\| \le \|\Delta \hat{a}_{meas} + \vec{k}\| \\ -\Delta \hat{a}_{meas} & \text{if } \|\Delta \hat{a}_{meas} - \vec{k}\| > \|\Delta \hat{a}_{meas} + \vec{k}\| \end{cases}$$

The sample covariance input may be calculated as inversely proportional to the magnitude of the measurement $\|\Delta \vec{a}_{meas}\|$. The Kalman filter may be calculated according its normal definitions (refer R. E. Kalman, "A New Approach to Linear Filtering and Prediction Problems", Transactions of the ASME—Journal of Basic Engineering, vol 82, series D, pp. 35-45, 1960) except that for ease of implementation the state estimate and state covariance estimate may be forced to be fully diagonal and the state estimate may be normalized to a vector magnitude of 1 after each step and the estimated state covariance corrected by the same factor. The estimated state vector output may be an estimate of the forward direction vector, and the state covariance may be an estimate of the accuracy of the forward direction vector. The process covariance input may be decreased to allow more accurate estimation, or increased to allow rapid convergence of the filter when the unit may have been moved.

Finally, it is to be understood that various alterations, modifications and/or additions may be introduced into the constructions and arrangements of parts previously described without departing from the spirit or ambit of the invention.

The invention claimed is:

1. A brake controller for a towed vehicle braking system, said controller being adapted to be mounted in a towing or a towed vehicle having a longitudinal axis for generating a braking control signal to said towed vehicle braking system, said controller comprising:
   an inertial sensor including plural sensor axes adapted to be mounted in an undefined orientation relative to said longitudinal axis for generating sensor data associated with each sensor axis;
   a memory device for storing said sensor data associated with each sensor axis; and
   a processor for processing said sensor data in combination with a braking control signal to evaluate a forward direction vector for said inertial sensor, and for processing said sensor data in combination with said forward direction vector to determine acceleration of said vehicle in a forward direction independent of a frame of reference of said inertial sensor;
   whereby said brake controller is adapted to generate said control signal to said towed vehicle braking system in a manner that is substantially insensitive to acceleration of said vehicle in a lateral direction and to said orientation of said inertial sensor without prescribing a mounting orientation of said brake controller relative to said towing or towed vehicle.

2. A brake controller according to claim 1 wherein said processor is adapted to perform feedback calibration on said sensor data to facilitate evaluating said forward direction vector of said vehicle and/or to reduce effects of said acceleration of said vehicle in said lateral direction.

3. A brake controller according to claim 2 wherein said calibration includes single shot calibration to facilitate evaluating said forward direction vector of said vehicle and/or to reduce effects of said acceleration of said vehicle in said lateral direction.

4. A brake controller according to claim 2 wherein said calibration includes continuous calibration to facilitate evaluating said forward direction vector of said vehicle and/or to reduce effects of said acceleration of said vehicle in said lateral direction.

5. A brake controller according to claim 1 wherein said braking signal includes said braking control signal and/or a brake light signal of said towing vehicle.

6. A brake controller according to claim 5 wherein said processor is adapted to perform cross-correlation of said sensor data with said braking control signal and/or said brake light signal such that a direction of maximum correlation is used as an estimate of said forward direction vector.

7. A brake controller according to claim 6 wherein said cross-correlation is performed using vector mathematics and/or a filtering process.

8. A brake controller according to claim 7 wherein said cross-correlation is followed by filtering in an angular or vector domain.

9. A brake controller according to claim 6 wherein said cross-correlation is performed using filtering in an angular or vector domain.

10. A brake controller according to claim 1 wherein said towed vehicle includes a trailer.

11. A brake controller according to claim 1 wherein said inertial sensor includes a multi-axis accelerometer.

12. A brake controller according to claim 11 wherein said multi-axis accelerometer is adapted to sense braking forces on said towed and towing vehicles.

13. A brake controller according to claim 1 wherein said brake controller is mounted in said towing vehicle.

14. A method of operating a brake controller for a towed vehicle braking system, wherein said controller is adapted to be mounted in a towing or a towed vehicle having a longitudinal axis for generating a braking control signal to said towed vehicle braking system, said method comprising:
   mounting an inertial sensor including plural sensor axes in an undefined orientation relative to said longitudinal axis for generating sensor data associated with each sensor axis;
   storing said sensor data associated with each sensor axis in a memory device; and
   processing said sensor data in combination with a braking signal to evaluate a forward direction vector for said inertial sensor, and for processing said sensor data in combination with said forward direction vector to determine acceleration of said vehicle in a forward direction independent of a frame of reference of said inertial sensor;
   whereby said brake controller is adapted to generate said braking control signal to said towed vehicle braking system in a manner that is substantially insensitive to acceleration of said vehicle in a lateral direction and to said orientation of said inertial sensor without prescribing a mounting orientation of said brake controller relative to said towing or towed vehicle.

15. A method according to claim 14 wherein said processor is adapted to perform feedback calibration on said sensor data to facilitate evaluating said forward direction vector of said vehicle and/or to reduce effects of said acceleration of said vehicle in said lateral direction.

16. A method according to claim 15 wherein said calibration includes single shot calibration to facilitate evaluating said forward direction vector of said vehicle and/or to reduce effects of said acceleration of said vehicle in said lateral direction.

17. A method according to claim 15 wherein said calibration includes continuous calibration to facilitate evaluating said forward direction vector of said vehicle and/or to reduce effects of said acceleration of said vehicle in said lateral direction.

18. A method according to claim 14 wherein said processor is adapted to perform cross-correlation of said sensor data with said braking control signal such that a direction of maximum correlation is used as an estimate of said longitudinal axis.

19. A method according to claim 18 wherein said cross-correlation is performed using vector mathematics.

20. A method according to claim 19 wherein said cross-correlation is followed by filtering in an angular or vector domain.

21. A method according to claim 18 wherein said cross-correlation is performed using filtering in an angular or vector domain.

22. A method according to claim 14 wherein said towed vehicle includes a trailer.

23. A method according to claim 14 wherein said inertial sensor includes a multi-axis accelerometer.

24. A method according to claim 23 wherein said multi-axis accelerometer is adapted to sense braking forces on said towed and towing vehicles.

25. A method according to claim 14 wherein said brake controller is mounted in said towing vehicle.

* * * * *